(12) United States Patent
Cheng et al.

(10) Patent No.: US 11,761,829 B2
(45) Date of Patent: Sep. 19, 2023

(54) SENSOR PLACEMENT OPTIMIZATION DEVICE AND METHOD THEREOF

(71) Applicant: National Chung Cheng University, Chia-yi County (TW)

(72) Inventors: Chih-Chun Cheng, Tainan (TW); Wen-Nan Cheng, Tainan (TW); Ping-Chun Tsai, Taipei (TW); Shao-Rong Su, Tainan (TW); Yao-Huan Lei, New Taipei (TW); Wei-Jen Chen, Chiayi (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 448 days.

(21) Appl. No.: 17/078,125

(22) Filed: Oct. 23, 2020

(65) Prior Publication Data

US 2021/0372862 A1  Dec. 2, 2021

(30) Foreign Application Priority Data

May 26, 2020  (TW) ................................ 109117546

(51) Int. Cl.
 *G01K 15/00* (2006.01)
 *G01K 7/02* (2021.01)
(52) U.S. Cl.
 CPC ........... *G01K 15/002* (2013.01); *G01K 7/021* (2013.01)
(58) Field of Classification Search
 CPC ....... G01K 15/002; G01K 7/021; G01K 1/026
 See application file for complete search history.

(56) References Cited

U.S. PATENT DOCUMENTS 7,231,307 B2 * 6/2007 Takei ................... G01K 15/00
 374/126
10,111,600 B2 * 10/2018 Oz ....................... A61B 5/7203
(Continued)

FOREIGN PATENT DOCUMENTS

TW  200515112 A  5/2005
TW  I687783 B  3/2020

OTHER PUBLICATIONS

Translation of CN-106920232-A (Yang et al) (Year: 2017).*
(Continued)

*Primary Examiner* — Nathaniel T Woodward
(74) *Attorney, Agent, or Firm* — WPAT, P.C (57) ABSTRACT

A sensor placement optimization device is provided, which may include a preprocessing circuit and an operational circuit. The preprocessing circuit may perform a pre-process for the sensing signals of a plurality of temperature sensors, installed on a machine tool, to generate a pre-processed data. The operational circuit may execute a normalization for the pre-processed data to generate a normalized data, perform a principal component analysis for the normalized data to generate a dimensionality-reduced data and implement a principal component regression for the dimensionality-reduced data to obtain the contributions of the temperature sensors. Then, the operational circuit may rank the temperature sensors according to the contributions thereof to generate a ranking result and execute a screening process according to the ranking result to select at least one redundant sensor from the temperature sensors; afterward, the operational circuit may remove the redundant sensor from the temperature sensors.

18 Claims, 4 Drawing Sheets

(56) References Cited

U.S. PATENT DOCUMENTS

| | | | |
|---|---|---|---|
| 2010/0094582 A1* | 4/2010 | Cox | G01K 7/425 |
| | | | 702/130 |
| 2015/0300887 A1* | 10/2015 | Mandava | G01N 33/02 |
| | | | 702/130 |
| 2018/0106683 A1* | 4/2018 | Singh | G01K 1/024 |
| 2018/0224817 A1 | 8/2018 | Shih et al. | |

OTHER PUBLICATIONS

Ping-Chun Tsai et al., "Sensor placement methodology for spindle thermal compensation of machine tools", Accepted: Jan. 10, 2020, Springer-Verlag London Ltd., part of Springer Nature 2020, The International Journal of Advanced Manufacturing Technolog, https://link.springer.com/article/10.1007/s00170-020-04932-8.
TW OA issued on May 10, 2021.

* cited by examiner

SENSOR PLACEMENT OPTIMIZATION DEVICE AND METHOD THEREOF

CROSS REFERENCE TO RELATED APPLICATION

All related applications are incorporated by reference. The present application is based on, and claims priority from, Taiwan Application Serial Number 109117546, filed on May 26, 2020, the disclosure of which is hereby incorporated by reference herein in its entirety.

TECHNICAL FIELD

The disclosure relates a sensor placement optimization device and the method thereof.

BACKGROUND

Internal and external heat sources can cause thermal deformation to machine tool components, resulting in poor geometric accuracy in workpieces after machining. Therefore, both finding methods for reducing thermal deformation errors and compensating for such errors are urgent and receive considerable attention for high-accuracy machining.

Currently, there are many researches investigating the influence, caused by temperature increase, to the thermal deformation and the relevant compensation methods. The quantity and arrangement of the temperature sensors are very important during the process of establishing a thermal compensation model, which will influence the accuracy and stability of the thermal compensation model. In addition, installing the temperature sensors at correct positions is an important factor of determining the effectiveness of the thermal deformation error compensation.

In general, a user should install a large number of temperature sensors in order to enhance the accuracy and stability of the temperature compensation model, which significantly increases the installation cost of the temperature sensors.

Besides, the quantity and arrangement of the temperature sensors are usually determined by the user based on his/her own knowledge and experience, which results in high labor cost and time cost, so is of low efficiency.

Currently available technologies fail to provide an efficient approach to swiftly obtain the optimized quantity and arrangement of temperature sensors, so cannot effectively enhance the accuracy and stability of the thermal compensation model.

SUMMARY

An embodiment of the disclosure relates to a sensor placement optimization device, which includes a pre-processing circuit and an operational circuit. The pre-processing circuit performs a pre-process for the sensing signals of a plurality of temperature sensors, installed on a machine tool, to generate a pre-processed data. The operational circuit executes a normalization for the pre-processed data to generate a normalized data, performs a principal component analysis for the normalized data to generate a dimensionality-reduced data, and implements a principal component regression for the dimensionality-reduced data to obtain the contributions of the temperature sensors. Then, the operational circuit ranks the temperature sensors according to the contributions thereof to generate a ranking result and executes a screening process according to the ranking result to select at least one redundant sensor from the temperature sensors so as to remove the redundant sensor from the temperature sensors.

In an embodiment of the disclosure, the sensor placement optimization device further includes a signal acquisition circuit coupled to the temperature sensors and configured to receive the sensing signals of the temperature sensors.

In an embodiment of the disclosure, the pre-process removes noises, abnormal values and outliers from the sensing signals of the temperature sensors, and smooths the sensing signals of the temperature sensors.

In an embodiment of the disclosure, the operational circuit performs the principal component regression for an actual thermal deformation error and the dimensionality-reduced data to obtain the thermal deformation sensitivity of the sensing signal of each of the temperature sensors in order to determine the contributions of the temperature sensors and rank the temperature sensors according to the contributions to generate the ranking result.

In an embodiment of the disclosure, the operational circuit ranks the temperature sensors in a descending order according to the contributions of the temperature sensors to generate the ranking result.

In an embodiment of the disclosure, the operational circuit re-ranks the temperature sensors not including the redundant sensor according to the accuracies of the temperature sensors and selects the first k the temperature sensors.

In an embodiment of the disclosure, if the operational circuit determines that the temperature sensors not including the redundant sensor fail to conform to a predetermined standard, the operational circuit performs the pre-process, the normalization, the principal component analysis, the principal component regression and the screening process again after the redundant sensor is re-installed on the machine tool.

In an embodiment of the disclosure, the operational circuit executes the normalization for the pre-processed data via standard score (z-score).

In an embodiment of the disclosure, the screening process is singular value decomposition (SVD).

In an embodiment of the disclosure, the screening process is Pearson correlation, Kendall correlation, Spearman correlation or importance.

Another embodiment of the disclosure relates to a sensor placement optimization method, which includes the following steps: performing a pre-process for sensing signals of a plurality of temperature sensors, installed on a machine tool, to generate a pre-processed data by a pre-processing circuit; executing a normalization for the pre-processed data to generate a normalized data by an operational circuit; performing a principal component analysis for the normalized data to generate a dimensionality-reduced data by the operational circuit; implementing a principal component regression for the dimensionality-reduced data to obtain the contributions of the temperature sensors by the operational circuit; ranking the temperature sensors according to the contributions of the temperature sensors to generate a ranking result by the operational circuit; and executing a screening process according to the ranking result to select at least one redundant sensor from the temperature sensors and remove the redundant sensor from the temperature sensors by the operational circuit.

In an embodiment of the disclosure, the sensor placement optimization method further includes the following step: receiving the sensing signals of the temperature sensors by a signal acquisition circuit.

In an embodiment of the disclosure, the step of performing the pre-process for the sensing signals of the temperature sensors, installed on the machine tool, to generate the pre-processed data by the pre-processing circuit further includes the following step: removing noises, abnormal values and outliers from the sensing signals of the temperature sensors, and smoothing the sensing signals of the temperature sensors by the pre-processing circuit.

In an embodiment of the disclosure, the steps of implementing the principal component regression for the dimensionality-reduced data to obtain the contributions of the temperature sensors, and ranking the temperature sensors according to the contributions of the temperature sensors to generate a ranking result by the operational circuit further include the following steps: performing the principal component regression for an actual thermal deformation error and the dimensionality-reduced data to obtain the thermal deformation sensitivity of the sensing signal of each of the temperature sensors in order to determine the contributions of the temperature sensors by the operational circuit; and ranking the temperature sensors according to the contributions of the temperature sensors to generate the ranking result by the operational circuit.

In an embodiment of the disclosure, the operational circuit ranks the temperature sensors in a descending order according to the contributions of the temperature sensors to generate the ranking result.

In an embodiment of the disclosure, the sensor placement optimization method further includes the following step: re-ranking the temperature sensors not including the redundant sensor according to the accuracies of the temperature sensors and selecting the first k the temperature sensors by the operational circuit.

In an embodiment of the disclosure, the sensor placement optimization method further includes the following step: performing the pre-process, the normalization, the principal component analysis, principal component regression and the screening process again after the redundant sensor is re-installed on the machine tool by the operational circuit when the operational circuit determines that the temperature sensors not including the redundant sensor fail to conform to a predetermined standard.

In an embodiment of the disclosure, the operational circuit executes the normalization for the pre-processed data via standard score (z-score).

In an embodiment of the disclosure, the screening process is singular value decomposition (SVD).

In an embodiment of the disclosure, the screening process is Pearson correlation, Kendall correlation, Spearman correlation or importance.

As described above, the sensor placement optimization device and the method thereof may include the following advantages:

(1) According to one embodiment of the disclosure, the sensor placement optimization device can swiftly quantize the sensing signals and contributions of the temperature sensors and rank the temperature sensors accordingly in order to perform the screening process to determine the optimized quantity and arrangement of the temperature sensors. Thus, the device can achieve high efficiency, and effectively reduce labor cost and time cost.

(2) According to one embodiment of the disclosure, the sensor placement optimization device can execute the screening process to remove the redundant sensor(s) and keep the temperature sensors of higher contribution, so can effectively decrease the quantity of the temperature sensors and reduce the installation cost of the temperature sensors.

(3) According to one embodiment of the disclosure, the sensor placement optimization device can optimize the quantity and the arrangement of the temperature sensors according to the contributions of the temperature sensors, so can effectively increase the accuracy and stability of the thermal compensation model.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
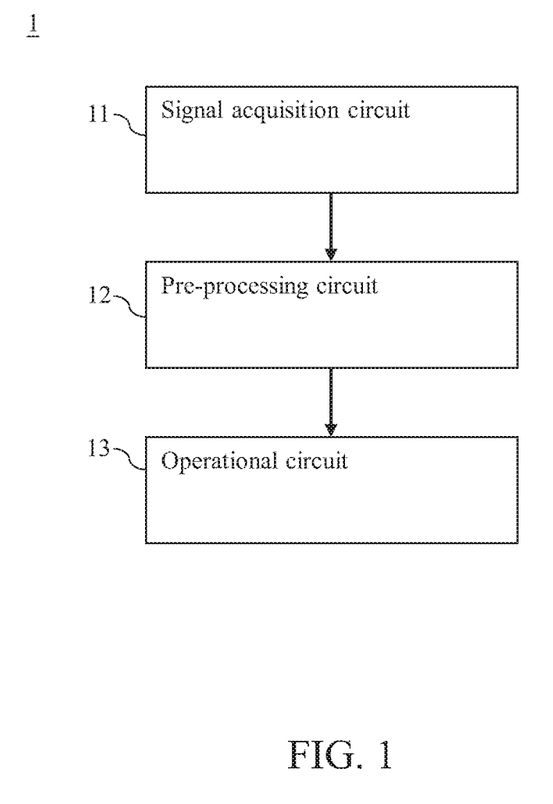
FIG. 1 is a block diagram of a sensor placement optimization device in accordance with a first embodiment of the disclosure.

With reference to FIG. 1 for a block diagram of a sensor placement optimization device in accordance with a first embodiment of the disclosure, the sensor placement optimization device 1 includes a signal acquisition circuit 11, a pre-processing circuit 12 and operational circuit 13.

The signal acquisition circuit 11 is coupled to a plurality of temperature sensors installed on a machine tool and receives the sensing signals (e.g. the raw data) of the temperature sensors.

The pre-processing circuit 12 is coupled to the signal acquisition circuit 11 and performs a pre-process for the sensing signals of the temperature sensors so as to generate a pre-processed data. More specifically, the pre-process can remove noises, abnormal values and outliers from the sensing signals of the temperature sensors, and smooths the sensing signals of the temperature sensors.

The operational circuit 13 is coupled to the pre-processing circuit 13 and executes a normalization to normalize the pre-processed data in order to generate a normalized data. In the embodiment, the operational circuit 13 may normalize the pre-processed data by standard score (z-score). In another embodiment, the operational circuit 13 may normalize the pre-processed data by other normalization methods.

Then, the operational circuit 13 implements principal component analysis (PCA) to reduce the dimensionality of the normalized data in order to generate a dimensionality-reduced data. In this way, the operational circuit 13 can project the data set into new coordinate systems via linear transformation in order to reduce the dimensionality thereof, which can discard the variables with small contributions and retain the variables with large contribution. Thus, the dimensionality of the data can be decreased and the dependency between the variables can be eliminated.

Afterward, the operational circuit 13 performs principal component regression (PCR) to analyze the dimensionality-reduced data so as to obtain the contributions of the temperature sensors. More specifically, the operational circuit 13 perform principal component regression according to the actual thermal deformation error obtained via measurement and the dimensionality-reduced data to obtain the thermal deformation sensitivity of the sensing signal of each of the temperature sensors in order to determine the contributions of the temperature sensors. Via the above step, the operational circuit 13 can determine the original variables having higher importance (e.g. the original temperature) according to the principal components selected via the aforementioned step.

Next, the operational circuit 13 ranks the temperature sensors in descending order according to the contributions of the temperature sensors so as to generate the ranking result. Then, the operational circuit 13 executes a screening process according to the ranking result to select one or more redundant sensors from the temperature sensors so as to remove the redundant sensors from the temperature sensors. In one embodiment, the screening process may be, but not limited to, singular value decomposition (SVD). In another embodiment, the screening process may be, but not limited to, Pearson correlation, Kendall correlation, Spearman correlation or importance. The screening process can find out the temperature sensors linearly dependent to each other so as to remove the redundant sensors. In this way, the operational circuit 13 can determine the optimized quantity and arrangement of the temperature sensors with a view to optimize the placement of the temperature sensors, such that the accuracy and stability of the thermal compensation model can be effectively enhanced.

Via the above mechanism, the sensor placement optimization device 1 can swiftly quantize the sensing signals and contributions of the temperature sensors and then rank the temperature sensors according to the contributions thereof. Then, the sensor placement optimization device 1 can further execute the screening process to determine the optimized quantity and arrangement of the temperature sensors. Therefore, the sensor placement optimization device can effectively reduce the labor cost and time cost, and can achieve high efficiency.

Besides, the sensor placement optimization device 1 can find out the redundant sensors, so the quantity of the temperature sensors can be decreased, which can effectively reduce the installation cost of the temperature sensors.

In another embodiment, the operational circuit 12 can determine whether the temperature sensors conform to a predetermined standard (e.g. a predetermined accuracy)? If they do, the sensor placement optimization ends. If they do not, the operational circuit 13 performs the pre-process, the normalization, the principal component analysis, the principal component regression and the screening process again after the redundant sensors are re-installed on the machine tool until the predetermined standard is achieved.

In still another embodiment, the operational circuit 13 can also re-rank the temperature sensors according to the sensing accuracies of the temperature sensors, and select the first k the temperature sensors, and then execute the measurement. The value of "k" can be determined according to actual requirements.

The embodiment just exemplifies the disclosure and is not intended to limit the scope of the disclosure. Any equivalent modification and variation according to the spirit of the disclosure is to be also included within the scope of the following claims and their equivalents.

Figure 2:
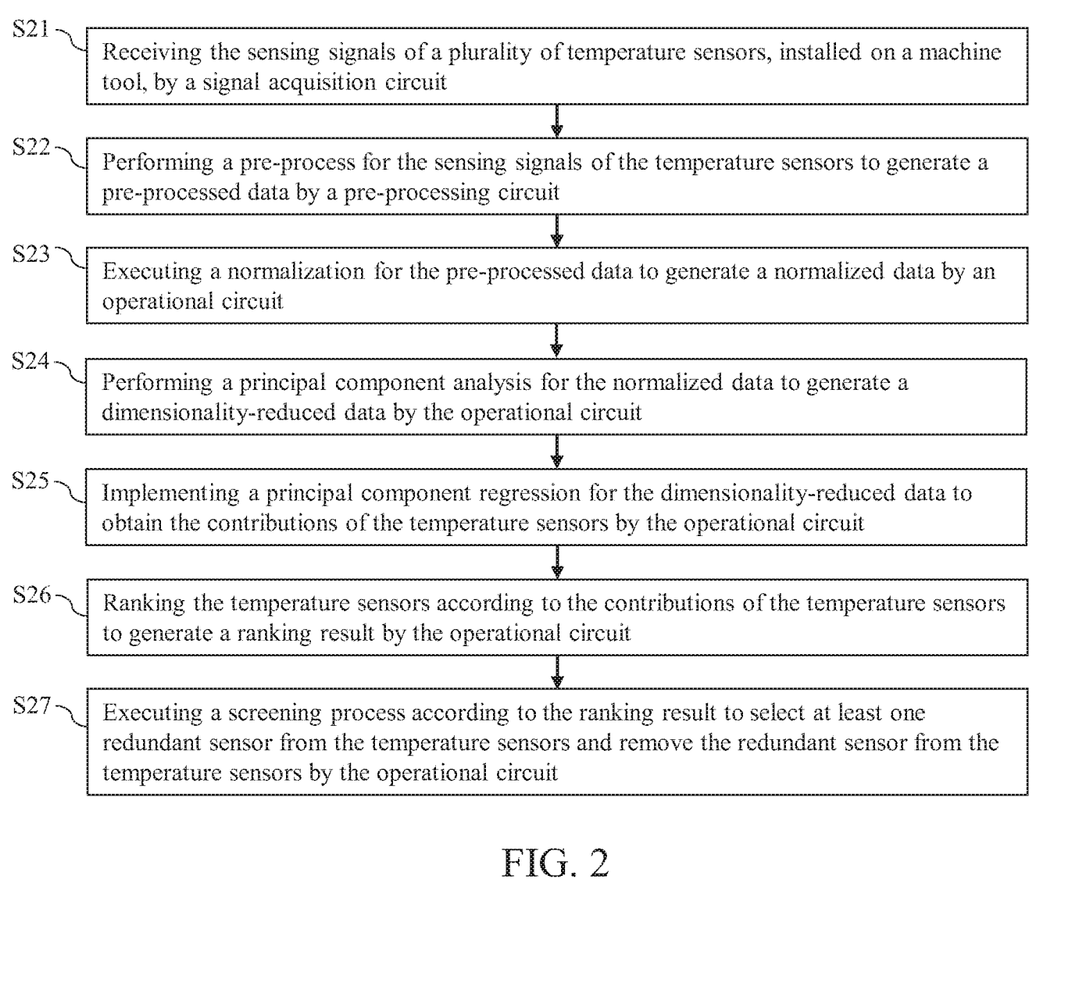
FIG. 2 is a flow chart of a sensor placement optimization method in accordance with the first embodiment of the disclosure.

With reference to FIG. 2 for a flow chart of a sensor placement optimization method in accordance with the first embodiment of the disclosure. The sensor placement optimization method of the embodiment includes the following steps:

Step S21: receiving the sensing signals of a plurality of temperature sensors, installed on a machine tool, by a signal acquisition circuit.

Step S22: performing a pre-process for the sensing signals of the temperature sensors to generate a pre-processed data by a pre-processing circuit.

Step S23: executing a normalization for the pre-processed data to generate a normalized data by an operational circuit.

Step S24: performing a principal component analysis for the normalized data to generate a dimensionality-reduced data by the operational circuit.

Step S25: implementing a principal component regression for the dimensionality-reduced data to obtain the contributions of the temperature sensors by the operational circuit.

Step S26: ranking the temperature sensors according to the contributions of the temperature sensors to generate a ranking result by the operational circuit.

Step S27: executing a screening process according to the ranking result to select at least one redundant sensor from the temperature sensors and remove the redundant sensor from the temperature sensors by the operational circuit.

It is worthy to point out that a user should install a large number of temperature sensors in order to enhance the accuracy and stability of the temperature compensation model, which significantly increases the installation cost of the temperature sensors. On the contrary, according to one embodiment of the disclosure, the sensor placement optimization device can execute the screening process to remove the redundant sensor(s) and keep the temperature sensors of higher contribution, so can effectively decrease the quantity of the temperature sensors and reduce the installation cost of the temperature sensors.

Besides, the quantity and arrangement of the temperature sensors are usually determined by the user based on his/her own knowledge and experience, which results in high labor cost and time cost, so is of low efficiency. On the contrary, according to one embodiment of the disclosure, the sensor placement optimization device can swiftly quantize the sensing signals and contributions of the temperature sensors and rank the temperature sensors accordingly in order to perform the screening process to determine the optimized quantity and arrangement of the temperature sensors. Thus, the device can achieve high efficiency, and effectively reduce labor cost and time cost.

Further, currently available technologies fail to provide an efficient approach to swiftly obtain the optimized quantity and arrangement of temperature sensors, so cannot effectively enhance the accuracy and stability of the thermal compensation model. On the contrary, according to one embodiment of the disclosure, the sensor placement optimization device can optimize the quantity and the arrangement of the temperature sensors according to the contributions of the temperature sensors, so can effectively increase the accuracy and stability of the thermal compensation model. As described above, the sensor placement optimization device according to the embodiments of the disclosure can actually achieve unpredictable technical effects.

Figure 3:
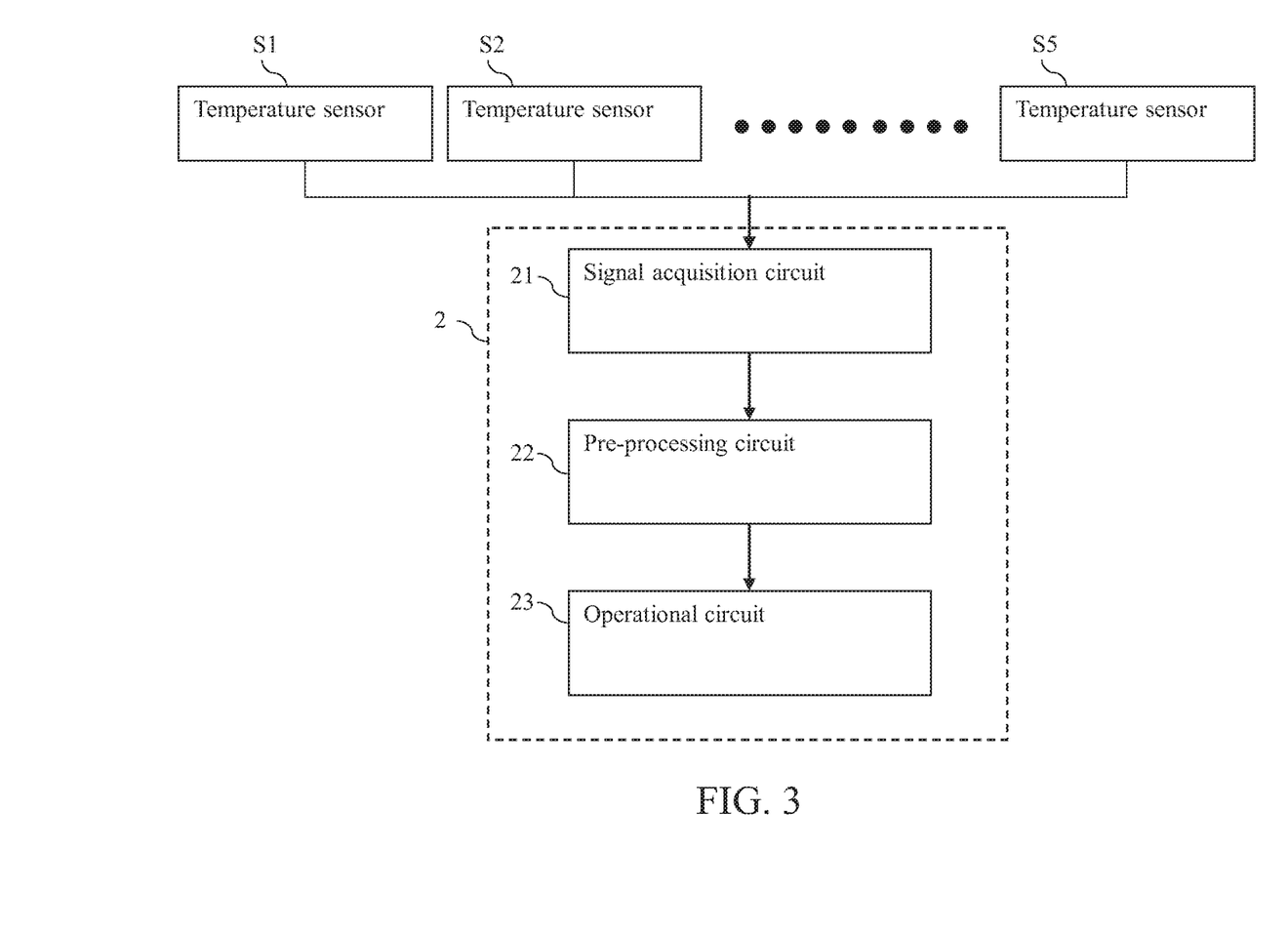
FIG. 3 is a block diagram of a sensor placement optimization device in accordance with a second embodiment of the disclosure.

With reference to FIG. 3 for a block diagram of a sensor placement optimization device in accordance with a second embodiment of the disclosure, the sensor placement optimization device 2 includes a signal acquisition circuit 21, a pre-processing circuit 22 and operational circuit 23.

The signal acquisition circuit 21 is coupled to a plurality of temperature sensors S1-S5 installed on a machine tool and receives the sensing signals of the temperature sensors S1-S5. The quantity of the temperature sensors S1-S5 can be changed according to actual requirements.

The pre-processing circuit 22 performs a pre-process to remove noises, abnormal values and outliers from the sensing signals of the temperature sensors S1-S5, and smooths the sensing signals of the temperature sensors S1-S5.

The operational circuit 23 is coupled to the pre-processing circuit 23 and normalizes the pre-processed data by z-score in order to generate a normalized data. The pre-processed data X can be expressed by a matrix, as shown in Equation (1) given below:

$$\underset{m\times n}{X} = \begin{bmatrix} x_{11} & x_{12} & \cdots & x_{1n} \\ x_{21} & x_{22} & \cdots & \vdots \\ \vdots & \vdots & \ddots & \vdots \\ x_{m1} & \cdots & \cdots & x_{mn} \end{bmatrix}_{m\times n} \quad (1)$$

In Equation (1), m stands for sample number; n stands for variable number. First, the operational circuit 23 calculates the average value $D_j$ and the standard deviation $S_j$ of the pre-processed data X, as shown in Equation (2) and Equation (3) given below:

$$D_j = \sum_{k=1}^{m} \frac{x_{kj}}{m}; j = 1, 2, \ldots, n, \quad (2)$$

$$S_j = \sqrt{\frac{1}{m-1}\sum_{k=1}^{m}(x_{kj}-D_j)^2}; j = 1, 2, \ldots, n. \quad (3)$$

The scale ranges of the variables of the sensing signals are different with each other. Thus, the normalization by z-score can deduct the average value of the population from each variable. Then, several differences can be obtained according to the sample standard deviation of the population, which can stand for the distance between each original variable and the average value of the population, as shown in Equation (4) given below:

$$\bar{x}_{kj} = \frac{x_{kj} - D_j}{S_j}; k = 1, 2, \ldots, m; j = 1, 2, \ldots, n. \quad (4)$$

A new matrix $X_{nor}$ can be obtained after the pre-processed data X are normalized by z-score, as shown in Equation (5) given below:

$$\underset{m\times n}{X_{nor}} = \begin{bmatrix} \bar{x}_{11} & \bar{x}_{12} & \cdots & \bar{x}_{1n} \\ \bar{x}_{21} & \bar{x}_{22} & \cdots & \vdots \\ \vdots & \vdots & \ddots & \vdots \\ \bar{x}_{m1} & \cdots & \cdots & \bar{x}_{mn} \end{bmatrix}_{m\times n} \quad (5)$$

Next, the operational circuit 23 implements principal component analysis (PCA) to reduce the dimensionality of the normalized data so as to obtain a dimensionality-reduced data. The covariance matrix $S_{xx}$ of $X_{nor}$ can be expressed by Equation (6) given below:

$$\underset{n\times n}{S_{xx}} = \frac{1}{m-1} \underset{n\times m}{X_{nor}^T} \underset{m\times n}{X_{nor}} \quad (6)$$

Afterward, the operational circuit 23 calculates n eigenvalue $\lambda_j$ and eigenvector $p_j$ of $S_{xx}$, which satisfies Equation (7) given below:

$$\underset{n\times n}{S_{xx}}\underset{n\times 1}{p_j} = \underset{1\times 1}{\lambda_j}\underset{n\times 1}{p_j}; i = 1, 2, \ldots, n. \quad (7)$$

The eigenvalue $\lambda_j$ is ranked in descending order to obtain corresponding eigenvector $p_j$; $p_j$ stands for the principal component (PC) loading vector. Next, $X_{nor}$ is projected onto each $p_j$ to obtain corresponding weight $t_j$, as shown in Equation (8) given below:

$$\underset{m\times 1}{t_j} = \underset{m\times n}{X_{nor}}\underset{n\times 1}{p_j}; j = 1, 2, \ldots, n, \quad (8)$$

In Equation (8), tj stands for the PC score vector, which represents the weights of $X_{nor}$ on the PC loading vectors, which can be considered the new coordinates after transformation. By calculating the contribution rate $f_j$ of each eigenvalue, the degree of importance or weight of the corresponding PC loading vector $p_j$ can be identified. Then, the PC loading vectors $p_j$ corresponding to the eigenvalues with small contributions can be eliminated, as shown in Equation (9) given below:

$$f_j = \frac{\lambda_j}{\sum_{k=1}^{n}\lambda_k}; j = 1, 2, \ldots, n. \quad (9)$$

The contribution of each eigenvalue can be obtained according to Equation (9). The operational circuit 23 discards the eigenvalues with small contribution and retains the first w the eigenvalues with large contribution to obtain the corresponding PC loading vector ($p'_j$). Then the dimensionality-reduced PC score vector $t'_j$ can be obtained, as shown in Equation (10) given below:

$$\underset{u\times 1}{t'_j} = \underset{u\times n}{X_{nor}}\underset{n\times 1}{p'_j}; j = 1, 2, \ldots, w. \quad (10)$$

Through the orthogonal projection of the pre-processed data in Equation (10), the operational circuit 23 can eliminate the dependency between variables via the linear transformation and retain the eigenvalues with large contribution without losing essential information. Finally, the data can be mapped on a new coordinate system to obtain a comprehensive index.

Afterward, the operational circuit 23 performs principal component regression to analyze the dimensionality-reduced data in order to obtain the contributions of the temperature sensors S1-S5. The regression equation (the independent variable is $X_{nor}$ and the dependent variable is Y) can be expressed by Equation (11) given below:

$$\underset{m\times 1}{Y} = \underset{m\times n}{X_{nor}} \underset{n\times 1}{\beta} + \varepsilon \tag{11}$$

In Equation (11), Y stands for the measured thermal deformation; β a stands for the weights of the original temperature measurement points obtained by principal component regression; F is the error vector of the regression equation. Each PC loading vector $p_j$ was combined into an eigen-matrix $P=[p_1, p_2, \ldots p_r]$. As $PP^T = L$ Equation (11) can be rewritten as Equation (12) given below:

$$\underset{m\times 1}{Y} = (\underset{m\times n}{X_{nor}} \underset{n\times r}{P})(\underset{r\times n}{P^T} \underset{n\times 1}{\beta}) + \varepsilon \tag{12}$$

Equation (12) can be rewritten as Equation (13) given below:

$$\underset{m\times 1}{Y} = \underset{m\times r}{T} \underset{r\times 1}{\theta} + \varepsilon \tag{13}$$

Accordingly, Equation (13.1) and Equation (13.2) can be derived, as follows:

$$\underset{m\times r}{T} = \underset{m\times n}{X_{nor}} \underset{n\times r}{P} \tag{13.1}$$

$$\underset{r\times 1}{\theta} = \underset{r\times n}{P^T} \underset{n\times 1}{\beta} \tag{13.2}$$

The purpose of Equation (13.1) is to transform the original temperature measurement matrix to the principal component coordinate system and only r linearly independent principal components in the principal component coordinate system. Equation (13.2) can be considered the regression coefficients of the principal component coordinate system. To obtain the minimum value of the error $\|\varepsilon\|$ of Equation (13), the optimal estimation $\hat{\theta}$ can be obtained by using the least-squares method, as shown in Equation (14) given below:

$$\underset{r\times 1}{\hat{\theta}} = (\underset{r\times m}{T^T} \underset{m\times r}{T})^{-1}(\underset{r\times m}{T^T} \underset{m\times 1}{Y}) \tag{14}$$

The purpose of Equation (14) is to conduct regression analysis under the principal component coordinate system so as to obtain the regression coefficients $\hat{\theta}$ under the principal component coordinate system. Then, the regression coefficients $\hat{\theta}$ can be transformed to the original physical coordinate system, as shown in Equation (14.1) given below:

$$\underset{n\times 1}{\beta} = \underset{n\times r}{P} \underset{r\times 1}{\theta} \tag{14.1}$$

$\hat{\theta}$ can be substituted into Equation (13) and then an approximation $\hat{Y}$ can be obtained, as shown in Equation (15) given below:

$$\underset{m\times 1}{\hat{Y}} = \underset{m\times n}{X_{nor}}(\underset{n\times r}{P} \underset{r\times 1}{\hat{\theta}}) \tag{15}$$

In Equation (15), Y stands for the least-squares estimated value of spindle thermal deformation; Equation (14.1) stands for the coefficients of the regression equation, which also indicates the effects of $X_{nor}$ on $\hat{Y}$, which can be normalized as Equation (16) in order to perform the ranking of the temperature measurement points. Equation (16) is as follows:

$$\frac{\left|\underset{n\times 1}{\beta}\right|}{\sum_1^n \left|\underset{n\times 1}{\beta}\right|} \times 100\% \tag{16}$$

Afterward, the operational circuit 23 can rank the temperature sensors S1-S5 in descending order according to the contributions of the temperature sensors S1-S5 so as to obtain a ranking result.

Then, the operational circuit 23 can execute singular value decomposition according to the ranking result to select one or more redundant sensors from the temperature sensors S1-S5. First, the operational circuit 23 establishes a fictitious random data, which is a 300×5 matrix A={x1, x2, x3, x4, x5}. Each column of the matrix A stands for the temperature history measured by each of the temperature sensors S1-S5.

Next, the operational circuit 23 re-ranks the matrix A in descending order according to the contributions of the temperature sensors S1-S5 to generate a matrix $A_R$={x4, x2, x5, x1, x3}. Afterward, the operational circuit 23 calculates the two columns of the matrix $A_R$ by singular value decomposition, which can be represented by a matrix $A_{R1}$={x4, x2}. Then, the operational circuit 23 determines whether the matrix condition number C. of the matrix $A_{R1}$ is less than a threshold (in this embodiment, the threshold is 20). If the matrix condition number $C_n$ is less than the threshold, the temperature sensor S2 is not a redundant sensor. After that, the operational circuit 23 adds the temperature sensor S5 ranked third to the third column of the matrix $A_{R1}$, which can be represented by a matrix $A_{R2}$={x4, x2, x5}. In this embodiment, the matrix condition number C. of the matrix $A_{R2}$={x4, x2, x5} is greater than the threshold, so the temperature sensor S5 is a redundant sensor. Similarly, the operational circuit 23 adds the temperature sensor S1 ranked fourth to the third column of the matrix $A_{R1}$, which can be represented by a matrix $A_{R3}$={x4, x2, x1} and repeats the above steps so as to screen out all redundant sensor(s). Afterward, the operational circuit 23 re-ranks the residual temperatures S1~S4 and obtains the new ranking {x2, x4, x1, x3}.

The operational circuit 23 can determine whether the residual temperature sensors S1-S4 conform to a predetermine standard (e.g. a predetermine accuracy)? If they do, the sensor placement optimization ends. If they do not, the operational circuit 23 performs the pre-process, the normalization, the principal component analysis, the principal component regression and the screening process again after the redundant sensor S5 is re-installed on the machine tool until the predetermined standard is achieved.

The embodiment just exemplifies the disclosure and is not intended to limit the scope of the disclosure. Any equivalent modification and variation according to the spirit of the disclosure is to be also included within the scope of the following claims and their equivalents.

Figure 4:
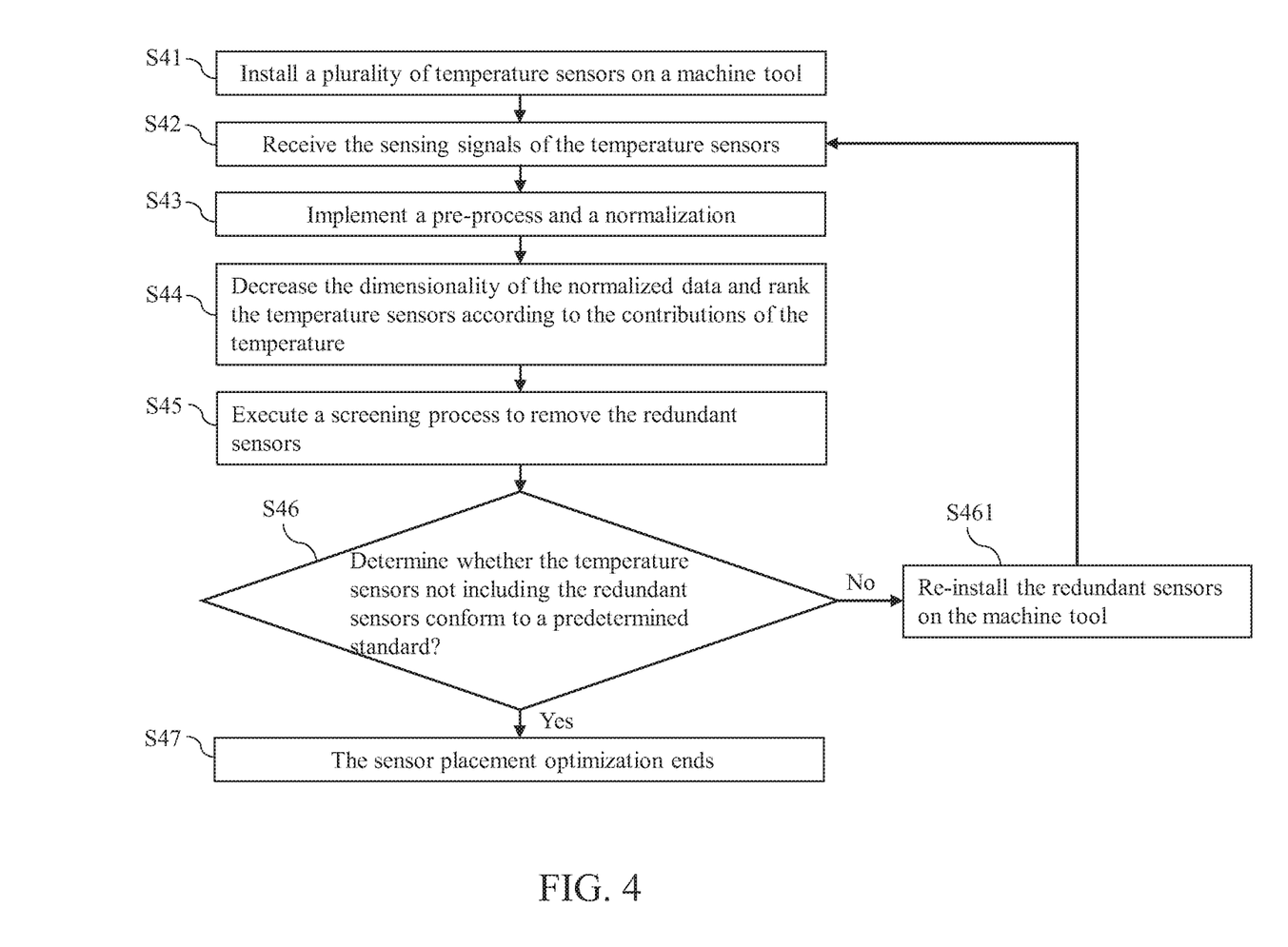
FIG. 4 is a flow chart of a sensor placement optimization method in accordance with the second embodiment of the disclosure.

With reference to FIG. 4 for a flow chart of a sensor placement optimization method in accordance with the second embodiment of the disclosure. The sensor placement optimization method of the embodiment includes the following steps:

Step S41: install a plurality of temperature sensors on a machine tool; then, the process proceeds to Step S42.

Step S42: receive the sensing signals of the temperature sensors; then, the process proceeds to Step S43.

Step S43: pre-process the sensing signals of the temperature sensors to obtain a pre-processed data and normalize the pre-processed data to obtain a normalized data; then, the process proceeds to Step S44.

Step S44: perform principal component analysis to decrease the dimensionality of the normalized data to obtain a dimensionality-reduced data, and implement principal component regression to analyze the dimensionality-reduced data to obtain the contributions of the temperature sensors, and rank the temperature sensors according to the contributions of the temperature sensors to obtain a ranking result; then, the process proceeds to Step S45.

Step S45: execute a screening process according to the ranking result to select one or more redundant sensors from the temperature sensors and remove the redundant sensors; then, the process proceeds to Step S46.

Step S46: determine whether the temperature sensors not including the redundant sensors conform to a predetermined standard? If they do, the process proceeds to Step S47; if they do not, the process proceeds to Step S461.

Step S461: re-install the redundant sensors on the machine tool; then, the process returns to Step S42.

Step S47: the sensor placement optimization ends.

This embodiment adopts three algorithms, including multiple regression (MR), back propagation neural network (BPNN) and random forest (RF) to test the accuracy of the thermal compensation of each of 16 temperature sensors installed on a machine tool. In this embodiment, BPNN is composed of an input layer, an output layer and three hidden layers. The input and output layers are temperature changes and spindle displacement from thermal and displacement sensors, respectively. The number of the neurons in the input layer is equal to the quantity of the temperature sensors after the screening process. The neuron number for the first hidden layer is 200 and 100 each for the second hidden layer and the third hidden layer layers. The active functions of all hidden layers are rectified linear units; the epoch is 150 with a learning rate of 0.005. Regarding the RF in this embodiment, from a training set, subsamples 65% of the size of the training set are randomly selected and trained into a tree model, and 300 trees could form the RF model. The maximum depth of a tree is not constrained but the minimum number of samples is three at each leaf node to avoid overfitting.

The accuracies of the thermal compensation of MR, BPNN and RF are listed in Table 1, Table 2 and Table 3 respectively. In Table 1, Table 2 and Table 3, the first column shows the selection method, which included Phase I only (top four sensors selected using ranking only) and Phase I+Phase II (top four sensors selected after ranking and screening); the second column and the third column show the training accuracy and the test accuracy.

Table 1 clearly shows that the thermal compensation accuracies of the temperature sensors selected by Phase I+Phase II are obviously greater than the thermal compensation accuracies of the temperature sensors selected by Phase I only. Table 2 and Table 3 also show similar result.

TABLE 1

Thermal compensation accuracies (MR)

| Selection method | Mean square error (MSE) of training data set | Mean square error (MSE) of training data set |
|---|---|---|
| Phase I | 20.47 | 15.67 |
| Phase I + Phase II | 8.15 | 8.53 |

TABLE 2

Thermal compensation accuracies (BPNN)

| Selection method | Mean square error (MSE) of training data set | Mean square error (MSE) of training data set |
|---|---|---|
| Phase I | 5.18 | 4.05 |
| Phase I + Phase II | 2.81 | 2.89 |

TABLE 3

Thermal compensation accuracies (RF)

| Selection method | Mean square error (MSE) of training data set | Mean square error (MSE) of training data set |
|---|---|---|
| Phase I | 0.94 | 2.27 |
| Phase I + Phase II | 0.42 | 1.13 |

To sum up, according to one embodiment of the disclosure, the sensor placement optimization device can swiftly quantize the sensing signals and contributions of the temperature sensors and rank the temperature sensors accordingly in order to perform the screening process to determine the optimized quantity and arrangement of the temperature sensors. Thus, the device can achieve high efficiency, and effectively reduce labor cost and time cost.

Besides, according to one embodiment of the disclosure, the sensor placement optimization device can execute the screening process to remove the redundant sensor(s) and keep the temperature sensors of higher contribution, so can effectively decrease the quantity of the temperature sensors and reduce the installation cost of the temperature sensors.

Moreover, according to one embodiment of the disclosure, the sensor placement optimization device can optimize the quantity and the arrangement of the temperature sensors according to the contributions of the temperature sensors, so can effectively increase the accuracy and stability of the thermal compensation model.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A sensor placement optimization device, comprising:
a preprocessing circuit, configured to perform a pre-process for sensing signals of a plurality of temperature sensors, installed on a machine tool, to generate a pre-processed data, wherein the pre-process removes noises, abnormal values and outliers from the sensing signals of the temperature sensors, and smooths the sensing signals of the temperature sensors; and an operational circuit, configured to execute a normalization for the pre-processed data to generate a normalized data, wherein the operational circuit performs a principal component analysis for the normalized data to generate a dimensionality-reduced data, and implements a principal component regression for the dimensionality-reduced data to obtain contributions of the temperature sensors, and ranks the temperature sensors according to the contributions of the temperature sensors to generate a ranking result, and executes a screening process according to the ranking result to select at least one redundant sensor from the temperature sensors so as to remove the redundant sensor from the temperature sensors.

2. The sensor placement optimization device of claim 1, further comprising a signal acquisition circuit coupled to the temperature sensors and configured to receive the sensing signals of the temperature sensors.

3. The sensor placement optimization device of claim 1, wherein the operational circuit performs the principal component regression for an actual thermal deformation error and the dimensionality-reduced data to obtain a thermal deformation sensitivity of the sensing signal of each of the temperature sensors in order to determine the contributions of the temperature sensors and rank the temperature sensors according to the contributions to generate the ranking result.

4. The sensor placement optimization device of claim 1, wherein the operational circuit ranks the temperature sensors in a descending order according to the contributions of the temperature sensors to generate the ranking result.

5. The sensor placement optimization device of claim 1, wherein the operational circuit re-ranks the temperature sensors not including the redundant sensor according to accuracies of the temperature sensors and selects the first k the temperature sensors.

6. The sensor placement optimization device of claim 1, wherein if the operational circuit determines that the temperature sensors not including the redundant sensor fail to conform to a predetermined standard, the operational circuit performs the pre-process, the normalization, the principal component analysis, the principal component regression and the screening process again after the redundant sensor is re-installed on the machine tool.

7. The sensor placement optimization device of claim 1, wherein the operational circuit executes the normalization for the pre-processed data via a standard score.

8. The sensor placement optimization device of claim 1, wherein the screening process is a singular value decomposition.

9. The sensor placement optimization device of claim 1, wherein the screening process is Pearson correlation, Kendall correlation, Spearman correlation or importance.

10. The sensor placement optimization method of claim 1, wherein the screening process is Pearson correlation, Kendall correlation, Spearman correlation or importance.

11. A sensor placement optimization method, comprising:
performing a pre-process for sensing signals of a plurality of temperature sensors, installed on a machine tool, to removing noises, abnormal values and outliers from the sensing signals of the temperature sensors, and smoothing the sensing signals of the temperature sensors in order to generate a pre-processed data by a pre-processing circuit;

executing a normalization for the pre-processed data to generate a normalized data by an operational circuit;

performing a principal component analysis for the normalized data to generate a dimensionality-reduced data by the operational circuit;

implementing a principal component regression for the dimensionality-reduced data to obtain contributions of the temperature sensors by the operational circuit;

ranking the temperature sensors according to the contributions of the temperature sensors to generate a ranking result by the operational circuit; and executing a screening process according to the ranking result to select at least one redundant sensor from the temperature sensors and remove the redundant sensor from the temperature sensors by the operational circuit.

12. The sensor placement optimization method of claim 11, further comprising:
receiving the sensing signals of the temperature sensors by a signal acquisition circuit.

13. The sensor placement optimization method of claim 11, wherein implementing the principal component regression for the dimensionality-reduced data to obtain the contributions of the temperature sensors, and ranking the temperature sensors according to the contributions of the temperature sensors to generate a ranking result by the operational circuit further comprising:
performing the principal component regression for an actual thermal deformation error and the dimensionality-reduced data to obtain a thermal deformation sensitivity of the sensing signal of each of the temperature sensors in order to determine the contributions of the temperature sensors by the operational circuit; and ranking the temperature sensors according to the contributions of the temperature sensors to generate the ranking result by the operational circuit.

14. The sensor placement optimization method of claim 11, wherein the operational circuit ranks the temperature sensors in a descending order according to the contributions of the temperature sensors to generate the ranking result.

15. The sensor placement optimization method of claim 11, further comprising:
re-ranking the temperature sensors not including the redundant sensor according to accuracies of the temperature sensors and selecting the first k the temperature sensors by the operational circuit.

16. The sensor placement optimization method of claim 11, further comprising:
performing the pre-process, the normalization, the principal component analysis, the principal component regression and the screening process again after the redundant sensor is re-installed on the machine tool by the operational circuit when the operational circuit determines that the temperature sensors not including the redundant sensor fail to conform to a predetermined standard.

17. The sensor placement optimization method of claim 11, wherein the operational circuit executes the normalization for the pre-processed data via a standard score.

18. The sensor placement optimization method of claim 11, wherein the screening process is a singular value decomposition.

* * * * *